United States Patent
Lopez-Uricoechea et al.

(10) Patent No.: US 10,140,434 B2
(45) Date of Patent: Nov. 27, 2018

(54) GROUP-BASED EXTERNAL SHARING OF ELECTRONIC DATA

(71) Applicant: Microsoft Technology Licensing, LLC, Redmond, WA (US)

(72) Inventors: Rafael Lopez-Uricoechea, Seattle, WA (US); Gaurav Doshi, Kirkland, WA (US); Sarat C. Subramaniam, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 15/197,068

(22) Filed: Jun. 29, 2016

(65) Prior Publication Data
US 2017/0323086 A1 Nov. 9, 2017

Related U.S. Application Data

(60) Provisional application No. 62/331,096, filed on May 3, 2016.

(51) Int. Cl.
| | |
|---|---|
| *H04L 29/00* | (2006.01) |
| *G06F 21/10* | (2013.01) |
| *G06F 21/57* | (2013.01) |
| *G06F 21/62* | (2013.01) |
| *H04L 29/06* | (2006.01) |
| *H04W 4/08* | (2009.01) |
| *H04W 12/08* | (2009.01) |

(52) U.S. Cl.
CPC ............ *G06F 21/10* (2013.01); *G06F 21/577* (2013.01); *G06F 21/6218* (2013.01); *H04L 63/104* (2013.01); *H04W 4/08* (2013.01); *H04W 12/08* (2013.01); *G06F 2221/034* (2013.01)

(58) Field of Classification Search
CPC .... G06F 21/10; G06F 21/577; G06F 21/6218; H04W 12/08; H04L 63/104
See application file for complete search history.

(56) References Cited

U.S. PATENT DOCUMENTS

| | | | |
|---|---|---|---|
| 7,533,420 B2 | 5/2009 | Battagin et al. | |
| 9,160,605 B1 | 10/2015 | Ducrou et al. | |

(Continued)

OTHER PUBLICATIONS

McGonnigle, Andrew, "Complete Guide to Google Drive Sharing", Published on: Mar. 1, 2015 Available at: https://www.bettercloud.com/monitor/google-drive-sharing-complete-guide/.

(Continued)

*Primary Examiner* — Morshed Mehedi
(74) *Attorney, Agent, or Firm* — Christopher J. Volkmann; Kelly, Holt & Christenson, PLLC

(57) ABSTRACT

A computing system that provides access to electronic content includes a processor, a data store, and a user interface component. The data store is coupled to the processor and configured to store the electronic content. The user interface component is coupled to the processor and configured to generate a user interface allowing an internal user to generate a sharing request to share electronic content with an external user. The processor is configured to determine whether the internal user is a member of a group that is allowed to externally share content and to inhibit external sharing of the electronic content if the internal user is not a member of the group that is allowed to externally share the electronic content.

19 Claims, 10 Drawing Sheets

(56) References Cited

U.S. PATENT DOCUMENTS

| | | | |
|---|---|---|---|
| 9,286,364 | B2 | 3/2016 | Kuruganti et al. |
| 9,734,347 | B2* | 8/2017 | Subramani .......... G06F 21/6218 |
| 2003/0023677 | A1 | 1/2003 | Zuill et al. |
| 2010/0161993 | A1* | 6/2010 | Mayer ..................... G06F 21/64 |
| | | | 713/178 |
| 2011/0078197 | A1* | 3/2011 | Zurko ............... G06F 17/30165 |
| | | | 707/783 |
| 2012/0331568 | A1 | 12/2012 | Weinstein et al. |
| 2014/0200918 | A1* | 7/2014 | Malec ..................... G06Q 50/24 |
| | | | 705/3 |
| 2014/0215551 | A1* | 7/2014 | Allain ..................... H04L 63/10 |
| | | | 726/1 |
| 2014/0230009 | A1* | 8/2014 | Subramani .......... G06F 21/6218 |
| | | | 726/1 |
| 2014/0259190 | A1* | 9/2014 | Kiang ................. G06F 21/6218 |
| | | | 726/30 |
| 2015/0006237 | A1 | 1/2015 | Beck et al. |
| 2015/0012741 | A1 | 1/2015 | Lim |
| 2015/0106877 | A1 | 4/2015 | Meyers et al. |
| 2015/0269628 | A1* | 9/2015 | Urtso ................. G06Q 30/0269 |
| | | | 705/14.66 |
| 2016/0085602 | A1 | 3/2016 | Jacobson et al. |
| 2016/0099975 | A1 | 4/2016 | Banatwala et al. |
| 2017/0220657 | A1* | 8/2017 | Nivala ............... G06F 17/30563 |

OTHER PUBLICATIONS

"Manage external sharing for your SharePoint Online environment", Published on: Jan. 18, 2016 Available at: https://support.office.com/en-us/article/Manage-external-sharing-for-your-SharePoint-Online-environment-c8a462eb-0723-4b0b-8d0a-70feafe4be85.

Love, et al., "Add or change users in Azure Active Directory", Retrieved on: Apr. 21, 2016 Available at: https://azure.microsoft.com/en-in/documentation/articles/active-directory-create-users/.

"BOX Community" Published on: Dec. 16, 2014 Available at: https://community.box.com/t5/For-Admins/Admin-Settings-Content-amp-Sharing-Collaboration/ta-p/174.

"DropBox Business", Retrieved on: Apr. 21, 2016 Available at: https://www.dropbox.com/business/tour/administrative-tools.

"pCloud", Retrieved on: Apr. 21, 2016 Available at: https://www.pcloud.com/help/business-help-center/how-does-external-sharing-work.

"Tresorit", In White Paper of Tresorit, Retrieved on: Apr. 21, 2016, 5 pages.

International Search Report and Written Opinion for International Patent Application No. PCT/US2017/029554, dated Aug. 8, 2017, date of filing: Apr. 26, 2017, 14 pages.

* cited by examiner

FIG. 5

GROUP-BASED EXTERNAL SHARING OF ELECTRONIC DATA

CROSS-REFERENCE TO RELATED APPLICATION

The present application is based on and claims the benefit of U.S. provisional patent application Ser. No. 62/331,096, filed May 3, 2016, the content of which is hereby incorporated by reference in its entirety.

BACKGROUND

Storage of electronic files, such as documents, photos, spreadsheets, presentations, videos, songs, and more is virtually a necessity in modern times. Centralized storage of and access to such files in a network-accessible manner allows the files to be accessed and maintained easily and effectively from a variety of network-connected devices. One form of such storage is an on-line storage platform that is accessible over the Internet and allows users and/or organizations to create accounts with the on-line storage provider in order to securely upload, access, edit, and delete such electronic files.

With the digital storage of electronic files, it is easy to share such files with others in order to collaborate on a document or a project. However, in the context of organizations, sharing of electronic files can present a security risk. If a file is shared with a user outside of the organization (external user) improperly, it may cause a leak of corporate secrets or have other undesirable effects. Accordingly, organizations are highly sensitive to external sharing of electronic files.

The discussion above is merely provided for general background information and is not intended to be used as an aid in determining the scope of the claimed subject matter.

SUMMARY

A computing system that provides access to electronic content includes a processor, a data store, and a user interface component. The data store is coupled to the processor and configured to store the electronic content. The user interface component is coupled to the processor and configured to generate a user interface allowing an internal user to generate a sharing request to share electronic content with an external user. The processor is configured to determine whether the internal user is a member of a group that is allowed to externally share content and to inhibit external sharing of the electronic content if the internal user is not a member of the group that is allowed to externally share the electronic content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 5 is a diagrammatic view of a user interface of a user attempting to share a file externally.

DETAILED DESCRIPTION

Figure 1:
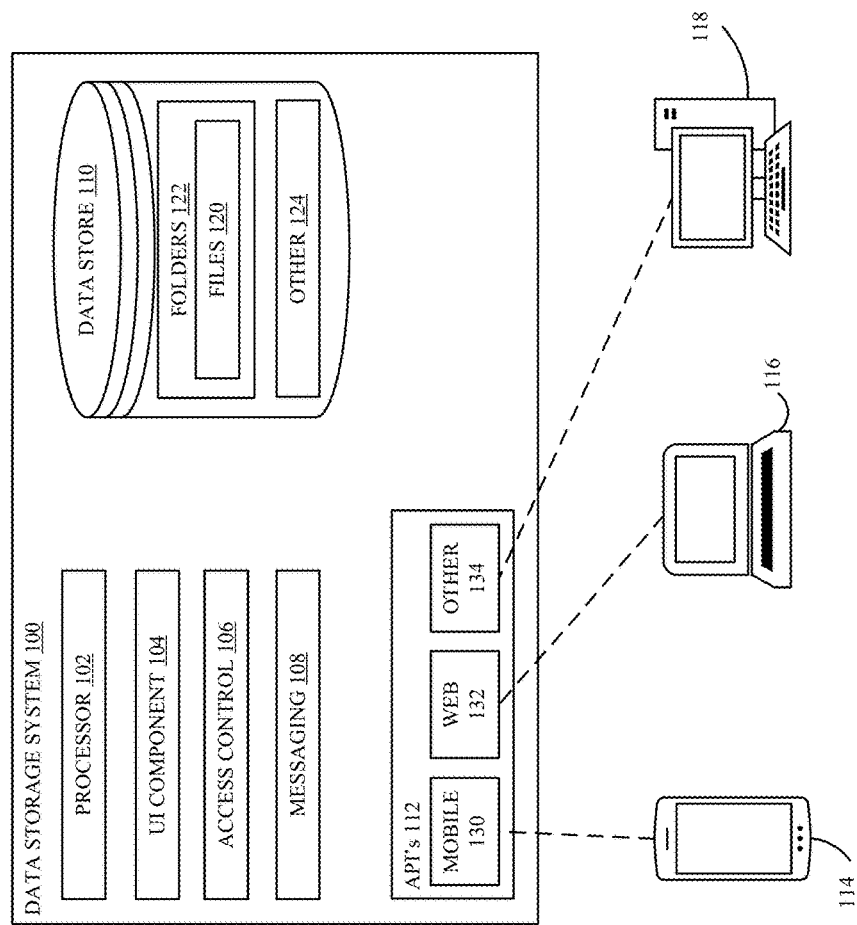
FIG. 1 is a diagrammatic view of a network-accessible data storage system with which embodiments described herein are particularly useful.

As set forth above, many organizations are concerned about external sharing of files that may lead to leaking corporate secrets. Accordingly, such organizations are typically not willing to enable external sharing for all members of the organization. However, this may create some difficulties as some users may have legitimate business needs in order to enable external sharing for some teams or groups within the organization. For example, employees in a research lab part of the organization may need to collaborate with academia for research, or the marketing department may need to work with advertising agencies. Currently, external sharing of electronic files for centralized electronic data storage systems is generally provided as an all-or-nothing condition. Accordingly, an administrator of an organization's files can enable external sharing for everyone in the organization thereby allowing all users to share with people outside of the organization. As can be appreciated, this situation may not provide the most secure scenario for maintaining corporate secrets and other confidential organizational information. Conversely, an administrator is currently able to disable all such external sharing and thus no users will be able to share with users outside of the organization. Accordingly, the current all-or-nothing condition provides challenges for organizations with at least some members of the organization that require external sharing in order to address organizational needs, but for whom such external sharing comes with the risk of improper sharing or organizational files.

Embodiments disclosed herein generally provide an external sharing solution for electronic data of an organization based on group membership. Individual groups, defined herein as security groups, can be selected to share certain portions or organizational content or files externally, while others in the organization may not be allowed to share organizational files.

While embodiments described herein generally have wide applicability to any electronic system that is able to store electronic files and allow multiple users to selectively access and share such electronic files, the remainder of this description will be described with respect to an on-line data storage system that is accessible over the Internet. This embodiment is considered a cloud computing embodiment.

Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of the architecture as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 1 is a diagrammatic view of an on-line data storage system with which embodiments described herein are particularly useful. Data storage system 100 includes processor 102, user interface (UI) component 104, access control component 106, messaging component 108, and data store 110. Additionally, while not specifically shown in FIG. 1, data storage system 100 includes suitable circuitry or other arrangements to enable data storage provider 100 to connect to a network in order to provide access to devices 114, 116, and 118. Each of devices 114, 116, and 118 couples to or interacts with data storage system 100 via a suitable application programing interface 112. For example, mobile device 114 interacts with data storage system 100 through mobile device application API 130 while laptop computer 116 may interact with data storage system 100 via web API 132. Further still, it is expressly contemplated that other devices, such as computer 118, may interact with data storage system 100 via other API 134. Regardless, in one embodiment, all such interactions with data storage system 100 via the variety of user devices are through suitable application programming interfaces 112 appropriate for that particular modality.

Processor 102 is illustratively a computer processor that has associated memory and timing circuitry, not separately shown. Processor 102 is illustratively a functional part of data storage system 100 and facilitates the functionality of data storage system 100 in providing access to data in data store 110.

UI component 104 is illustratively controlled by other components, servers, or items in data storage provider 100 in order to generate user interface displays for users using devices 114, 116, and 118. Devices 114, 116, and 118 are merely provided as examples of various user devices that may be used to interact with system 100. In the illustrated example, device 114 is a mobile device, such as a smartphone; device 116 is a laptop or notebook computer; and device 118 is a desktop computer. It will be noted, however, there can also be a user interface component on devices 114, 116, and 118 which generates those user interface displays as well. Further, it will be noted that user interface component 104 can generate the user interface displays itself, or under the control of other items shown in FIG. 1.

The user interface displays illustratively include user input mechanisms that allow the users to control and manipulate data storage provider 100, in order to upload, access, share, and manage electronic files stored within data store 110. The user input mechanisms can include a wide variety of different types of user input mechanisms, such as links, icons, buttons, drop down menus, text boxes, check boxes, etc. In addition, the user input mechanisms can be actuated by the user in a wide variety of different ways. For instance, they can be actuated using touch gestures (where the display is touch sensitive), a hard or soft keyboard or keypad, a point and click device (such as a mouse or trackball), buttons, joysticks, or other actuators. Additionally, where data storage provider 100 or one of devices 114, 116, and 118 has speech recognition components, the user input mechanisms can also be actuated by using voice commands.

Access control component 106 may employ an access control list or other suitable structure that includes information that indicates permissions or access rights for each user or group of users that are able to use data storage provider 100. Additionally, access control component 106 may maintain a list of authorized users for each organization or tenant for which data storage provider 100 provides data storage services. In one embodiment, access control component 106 can provide Active Directory services in order to authenticate and authorize users and/or various devices 114, 116, and 118. Accordingly, a list of users within the organization (i.e. internal users) will be maintained by access control component 106, thereby allowing access control component 106 to identify other users (outside of the organization) as any user who is not listed as a member of the particular organization. Such users are considered to be external users. Sharing electronics files with external users can be a security risk for an organization, and should be carefully controlled. Access control component 106 may also include a listing of one or more security groups, and organizational content scope information indicating whether external sharing is allowed for that particular security group. In one example, a security group may be a number of users who comprise an organizational marketing department, and external sharing may be allowed for marketing project files within the data store 110.

Messaging component 108 may include a messaging server or other suitable device or logic that is able to compose and/or send messages to users. Accordingly, messaging component 108 may include an e-mail server that supports the known Simple Mail Transfer Protocol (SMTP). However, messaging component 108 may also include an instant messaging server (SMS) or any other device or logic that is able to provide messages to users. Further still, in embodiments where access to data storage provider 100 is provided to one or more of devices 114, 116, and 118 via an application executing upon said devices. Messaging component 108 may include code and/or suitable circuitry to surface such messages or notifications within the application executing upon such user devices. While messaging component 108 is shown as a component of data storage provider 100, it is expressly contemplated that messaging component 108 may be remote from data storage provider 100 and controlled or otherwise engaged by data storage system 100 to generate suitable messages, such as external sharing invitations.

Data store 110 is shown as a single data store that is local to data storage provider 100. However, it will be noted that data store 110, in actuality, may be comprised of a number of different data stores, all of which may be local to data storage provider 100, some of which may be local to data storage provider 100, or all of which may be remote therefrom. Data store 110 illustratively stores a number of electronic files 120 within folders 122. However, other forms of data 124 may also be stored by data store 110 and made available by data storage provider 100 for access by users.

Figure 2:
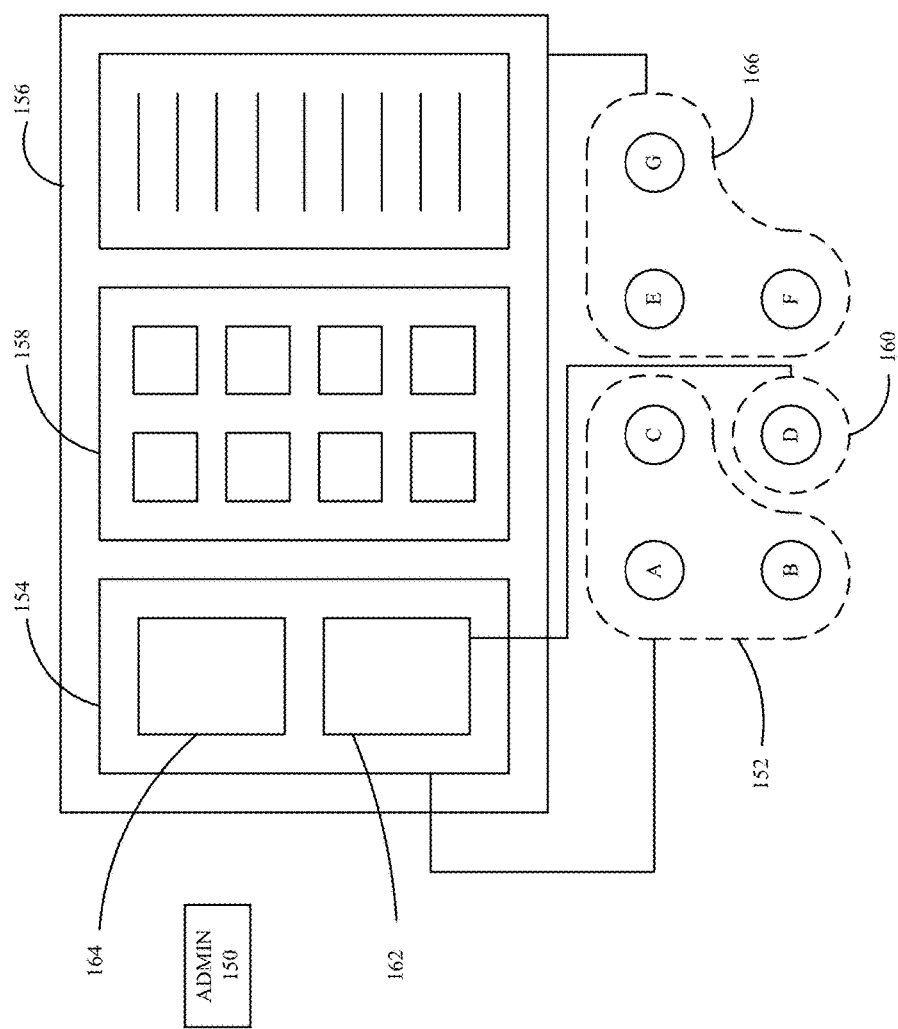
FIG. 2 is a diagrammatic view of multiple users interacting with a data storage system in accordance with embodiments described herein.

FIG. 2 is a diagrammatic view of a number of groups being defined by an administrator relative to organizational content. As shown in FIG. 2, administrator 150 has defined a first group 152 to have members A, B, and C. Further still, group 152 has been defined to allow external sharing of organizational site 154 within organizational content 156. Accordingly, when any of users A, B, and C wish to share any of the content within site 154, data storage system 100 will allow such operations. However, if any members of group 152 attempt to externally share content from site 158, such operations will be denied. As shown in FIG. 2, admin 150 has defined group 160 to be comprised of a single user (D) who is allowed to externally share a subset 162 of content within site 154. Accordingly, if user D attempts to externally share other content, such as content 164, the operation will be denied. Finally, administrator 150 has defined group 166 to be comprised of users E, F, and G. These users are allowed to externally share any information of organizational content 156.

Figure 3:
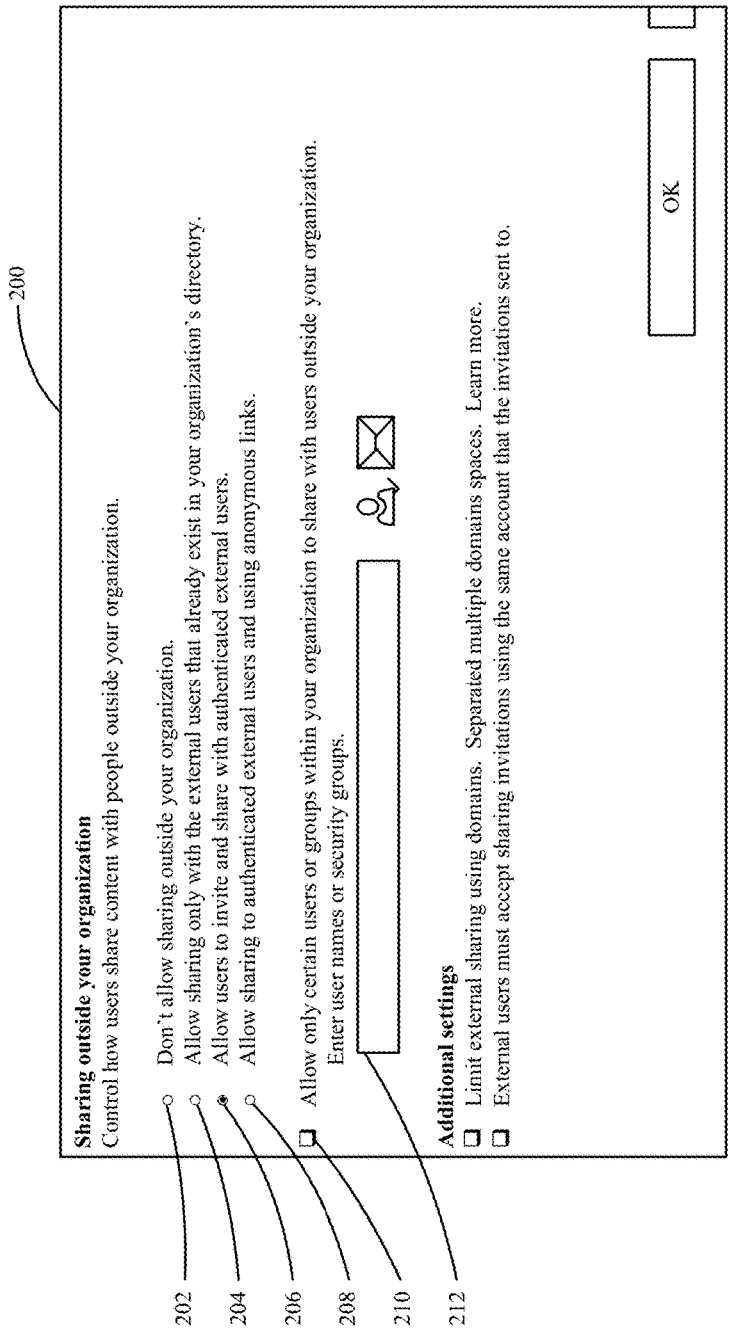
FIG. 3 is a diagrammatic view of an administrative console in accordance with one embodiment.

FIG. 3 is a diagrammatic view of an administration console 200 provided to administrator 150 by data storage system 100 via UI component 104. Administration console 200 may be displayed by whichever device 114, 116, and 118 administrator 150 is using. Console 200 provides administrator 150 with a number of options regarding how users may share content with people outside of the organization. As indicated at user interface element 202, the administrator may select that no sharing is allowed outside of the organization. Another option is indicated at user interface element 204 where, upon selection, sharing will only be allowed with external users that already exist in the organization's directory. In the example illustrated in FIG. 3, administrator 150 has selected user interface element 206 such that users of the organization will be allowed to invite and share with authenticated external users. A final option is illustrated at user interface element 208 where the administrator can select to allow sharing to external users and using anonymous access links. In accordance with one embodiment, a user interface element 210 is provided to allow administrator 150 to indicate that only certain users or groups within the organization will be allowed to share with users outside the organization. By selecting user interface element 210, the administrator can define one or more security groups using field 212.

Figure 4:
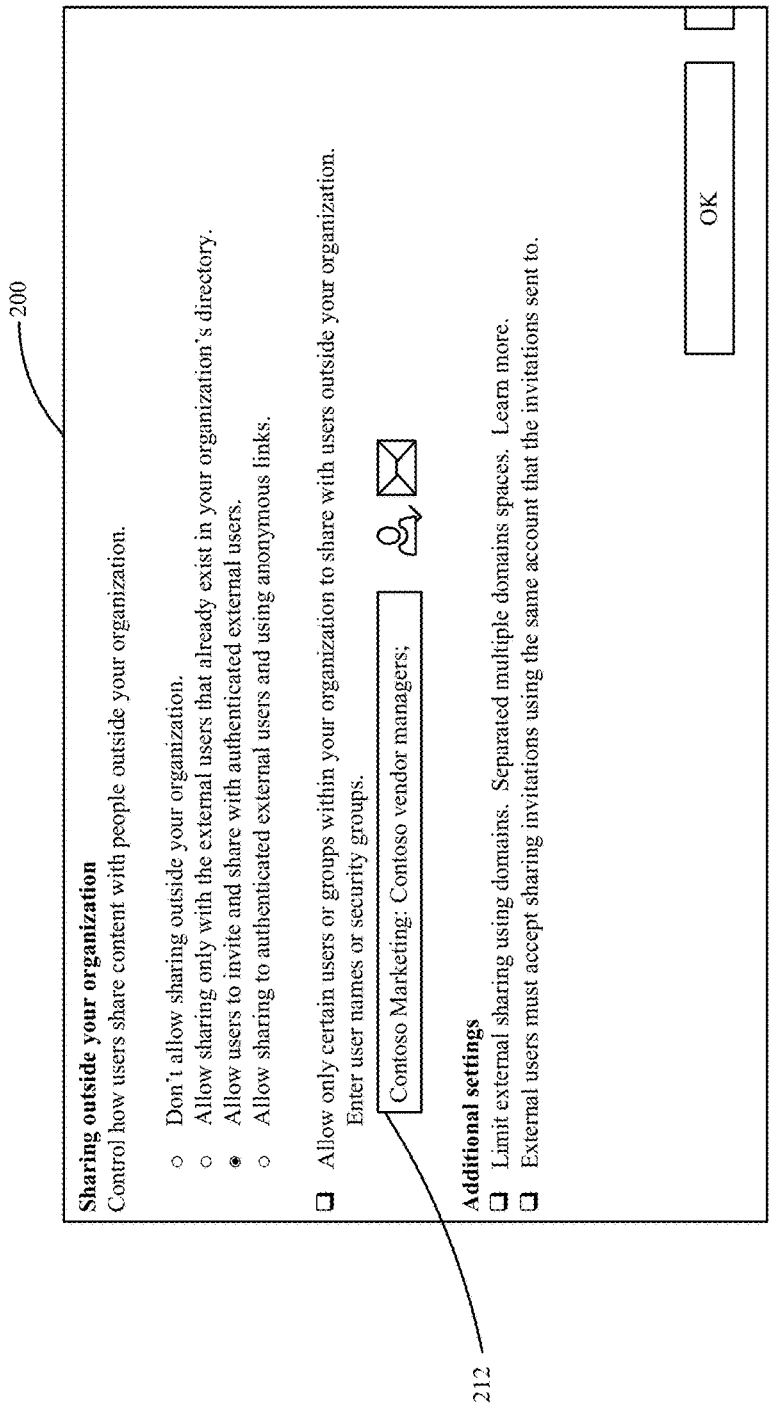
FIG. 4 is a diagrammatic view of an administrative console in accordance with one embodiment.

FIG. 4 is a diagrammatic view of administrative console 200 where administrator 150 has entered a pair of group identifiers into field 212. In particular, administrator 150 has selected that the Contoso Marketing group as well as the Contoso Vendor Managers will be allowed to share with users outside the organization. Additionally, as set forth above, this external sharing can further be specified with respect to all information of the organization, selected sites of the organization, selected folders of the organization, or even selected files of the organization, as desired.

Figure 5:
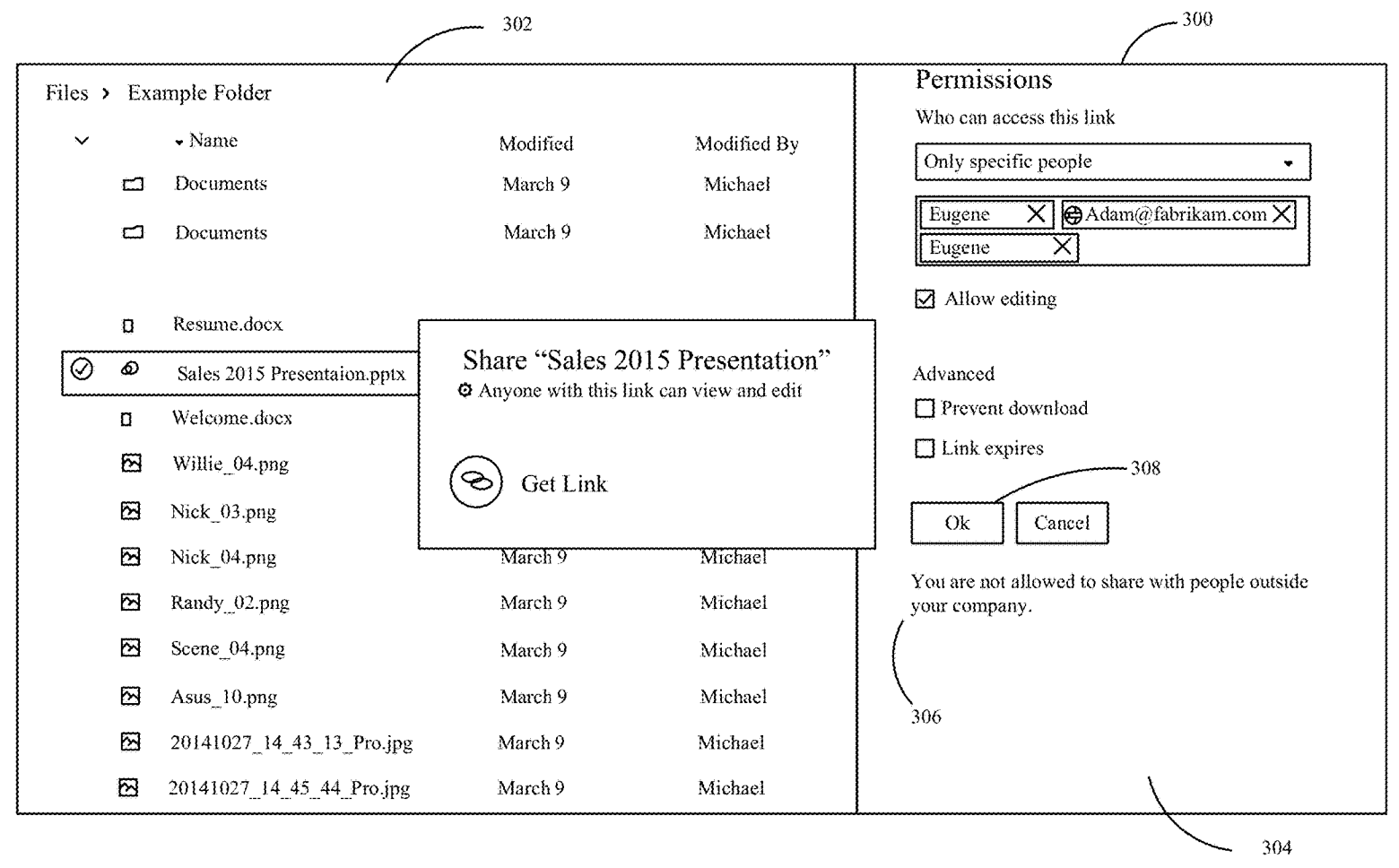

FIG. 5 is a diagrammatic view of a user interface provided to an organizational user of data storage system 100 in accordance with one embodiment. As shown in user interface 300, the user may have a primary display portion 302 that shows a number of files and folders to which the user has access. In the example shown in FIG. 5, the user has selected a file entitled "Sales 2015 Presentation.pptx" for sharing. In response to the user selecting the specified file for sharing, the user's device will interact with the appropriate API 112 to determine whether external sharing for the specified file is allowed for the user. In doing so, access control component 106 will review all group memberships for the particular user to determine if any such memberships allow external sharing of the selected file. In the example shown in FIG. 5, the user is not allowed to share externally. As shown in portion 304 of user interface 300, the user has received a notification 306 indicating that the user is not allowed to share with people outside the organization. Accordingly, the attempted share of "Sales 2015 Presentation.pptx" with Adam@fabrikam.com (an external user) will fail. While embodiments described herein can generally provide the user with notification 306 before the user selects OK button 308, it is also contemplated that the determination of whether the user is allowed to share externally can be performed after selection of OK button 308.

Figure 6:
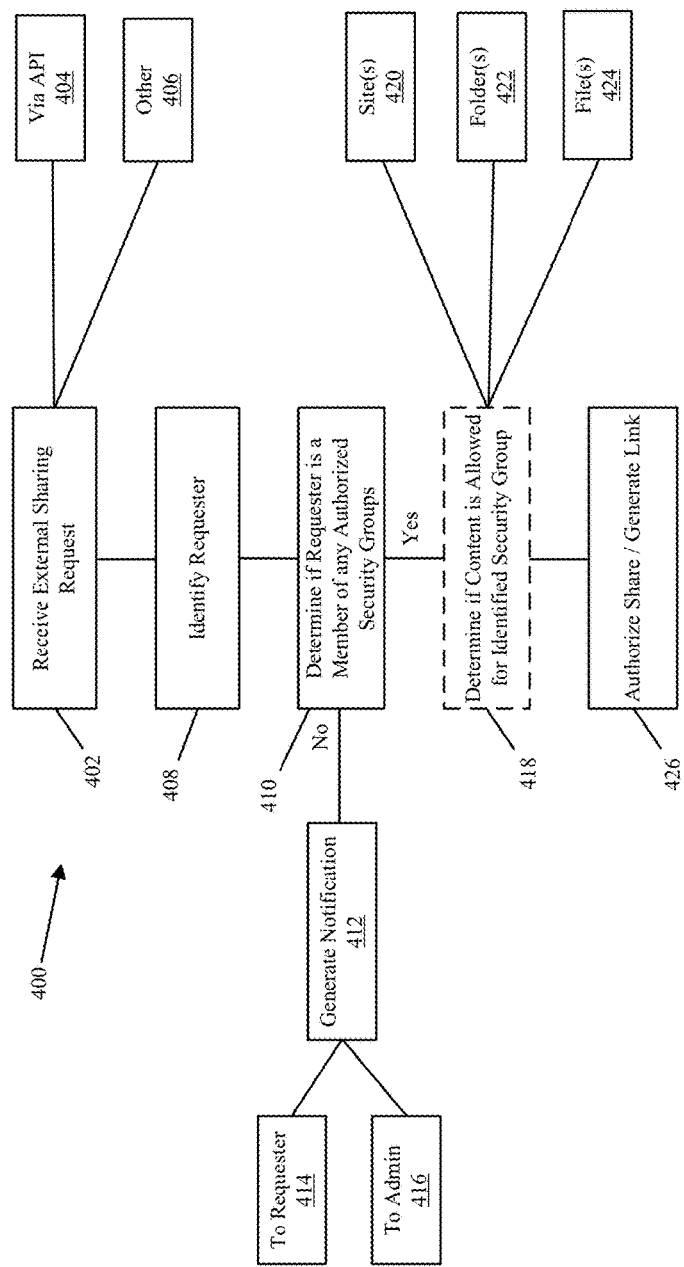
FIG. 6 is a flow diagram of a method of processing a sharing request with an electronic data storage system in accordance with one embodiment.

FIG. 6 is a flow diagram of a method of processing a sharing request with an electronic data storage system in accordance with one embodiment. Method 400 begins at block 402 where a data storage system receives an external sharing request. This external sharing request, in one embodiment, is received through an API, as indicated at block 404. However, in other embodiments, the request may be received in other ways, as indicated at block 406. Next, at block 408, the data storage system determines the identity of the requester of the external share. At block 410, data storage system 100, or a component thereof, such as access control component 106, determines whether the requester identified at block 408 is a member of any security groups for which external sharing is allowed. If the requester is not a member of any groups for which external sharing is allowed, control passes to block 412 where one or more notifications indicating denial of the external sharing request are provided. As indicated, the notification can be provided to the requester, as indicated at block 414 and/or the notification can be provided to the administrator, as indicated at block 416. On the other hand, if, at block 410, it is determined that the requester is a member of a security group for which external sharing is allowed, then the sharing operation may be allowed. In one embodiment, optional block 418 is performed to determine whether the content of the proposed sharing operation (e.g. site(s) 420, folder(s) 422, and/or file(s) 424) are allowed for the security group for which external sharing is allowed. Accordingly, in some embodiments, even when a user is a member of a group for which external sharing is allowed, some external sharing requests may be denied if the content that the user attempts to share is not authorized for the particular security group. At block 426, the external sharing request is granted by the data storage system. In one embodiment, such grant is provided in the form a sharing link being provided to the requester and/or the external user with whom the content is being shared.

Embodiments described herein generally provide a very specific and granular way in which administrators or responsible parties can specifically allow external sharing for groups of users within an organization. It is believed that this will enable such administrators to select those who can share with people outside the organization in at least two different levels. At a tenant level, the administrator can decide that external sharing may be restricted or allowed for all users within the organization. Further, more specific sharing levels can be set for site collections, projects, folders, and even files. If an administrator sets up external sharing at the site collection level, in accordance with one embodiment, this will take precedence over restrictions set up at the tenant level. Similarly, restrictions set up at a narrower scope will, in accordance with one embodiment, take precedence over restrictions set up at a larger scope.

While setting up or otherwise configuring external sharing on site collection, the administrator can be provided an option to append to the tenant level external sharing policy or to override it by specifying a local policy. For example, if at the tenant level, an administrator has defined that only users within Group A can share externally, but on site collection Foo the administrator selects to not append to the tenant level policy and chooses Group B to share externally, then within site collection Foo only members of group be will be allowed to share externally.

While embodiments are described with respect to administration console 200, it is expressly contemplated that such capabilities can be exposed as power shell commands in a tenant administration power shell. Further, in one embodiment, a site collection administrator will not have privileges or an administrative console to set up for his/her own site collection. It is a policy that only tenant administrators can set up, in one embodiment.

As set forth above, at the time of sharing, data storage system 100 will check to determine if the user that wishes to externally share belongs to one of the "allowed" groups in the site and/or in the tenant. If the user wishing to externally share the file is not allowed to so share, the user will receive an error message. In one embodiment, this enforcement of external sharing policy is performed at an API level using APIs 112 to thereby protect sharing through all entry points (web UX, mobile applications, office clients, and API calls).

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
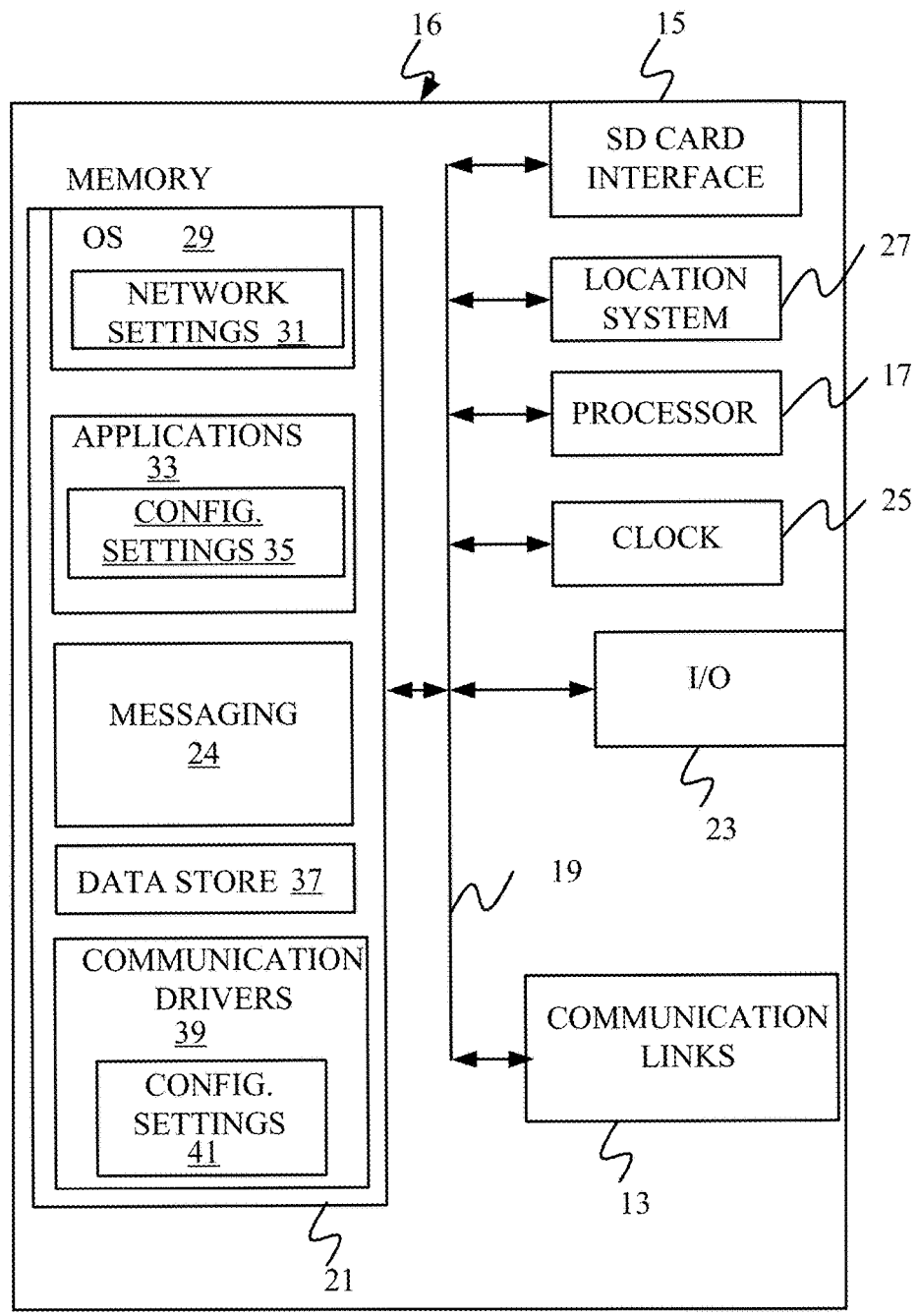
FIG. 7 provides a general block diagram of the components of a client device that can run components of the data storage system to interact with the data storage system.
Figure 8:
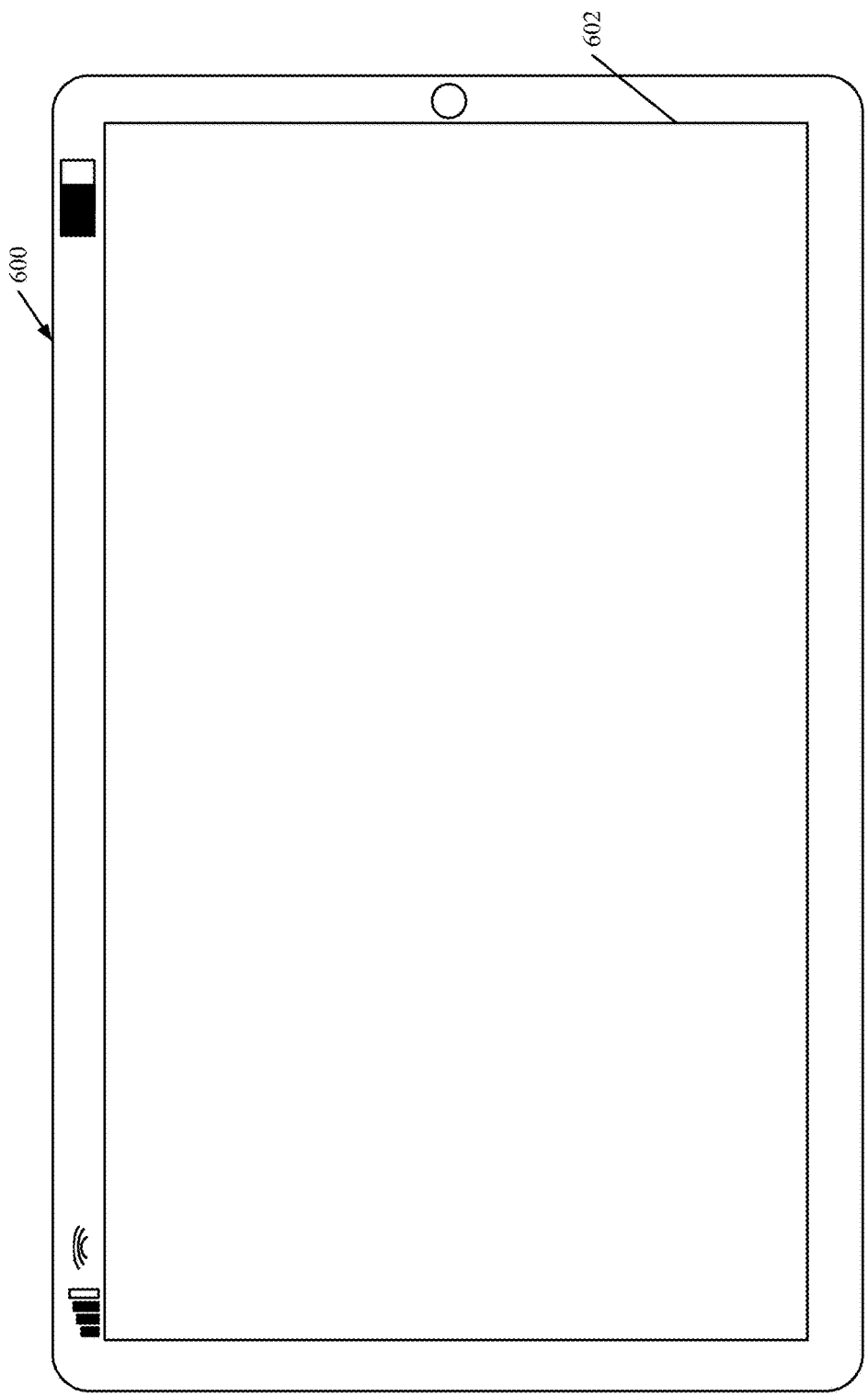
FIGS. 8 and 9 are diagrammatic views client devices that can run components of the data storage system to interact with the data storage system.
Figure 9:
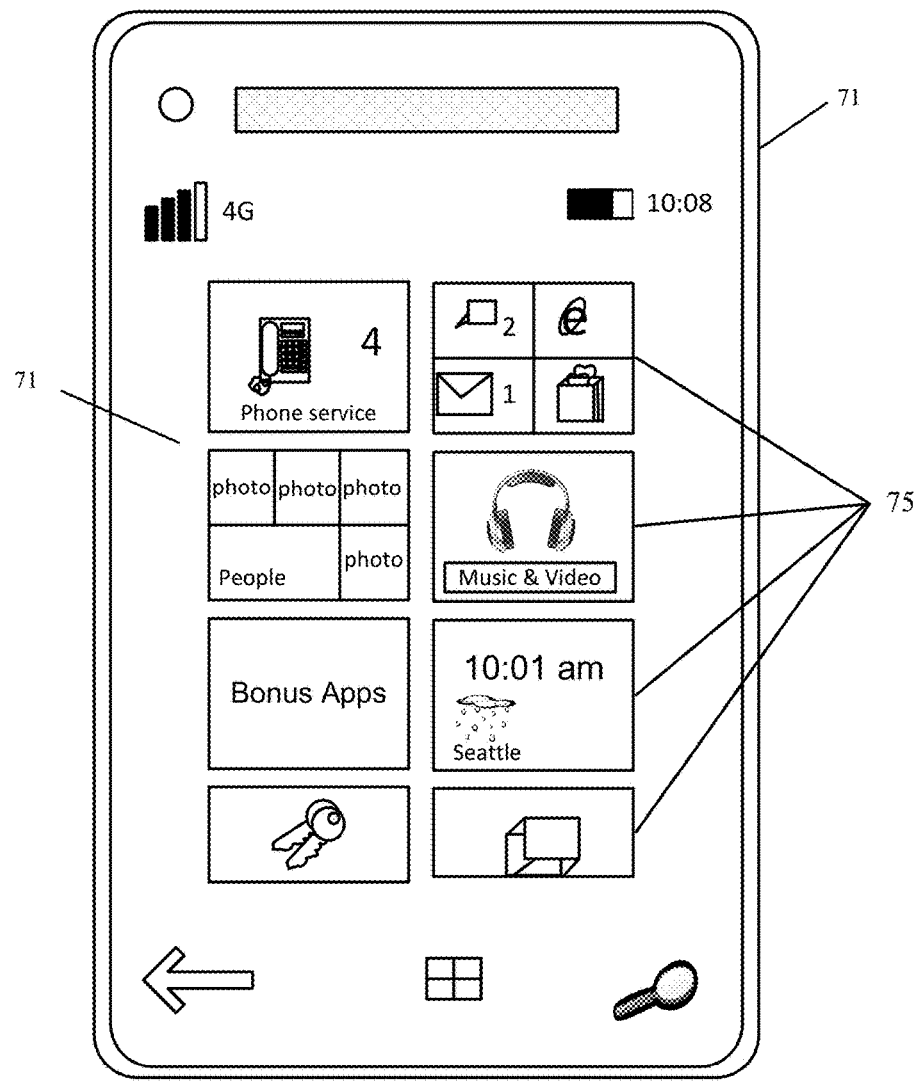

FIG. 7 is a simplified block diagram of one illustrative embodiment of a handheld or mobile computing device that can be used as a user's or client's hand held device 16, in which the present system (or parts of it) can be deployed. FIGS. 8 and 9 are examples of handheld or mobile devices.

FIG. 7 provides a general block diagram of the components of a client device 16 that can run components of data storage system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like messaging application 24) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Memory 21 can also store messaging application 24 in order to allow the user to send and receive electronic messages. Additionally, memory 21 can also store a dedicated application that allows the user to interact with online storage system 100 through a suitable application programming interface.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one embodiment in which device 16 is a tablet computer 600. In FIG. 8, computer 600 is shown with display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 9 is a diagrammatic view of another mobile device in which embodiments described herein are particularly useful. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of the devices 16 are possible.

Figure 10:
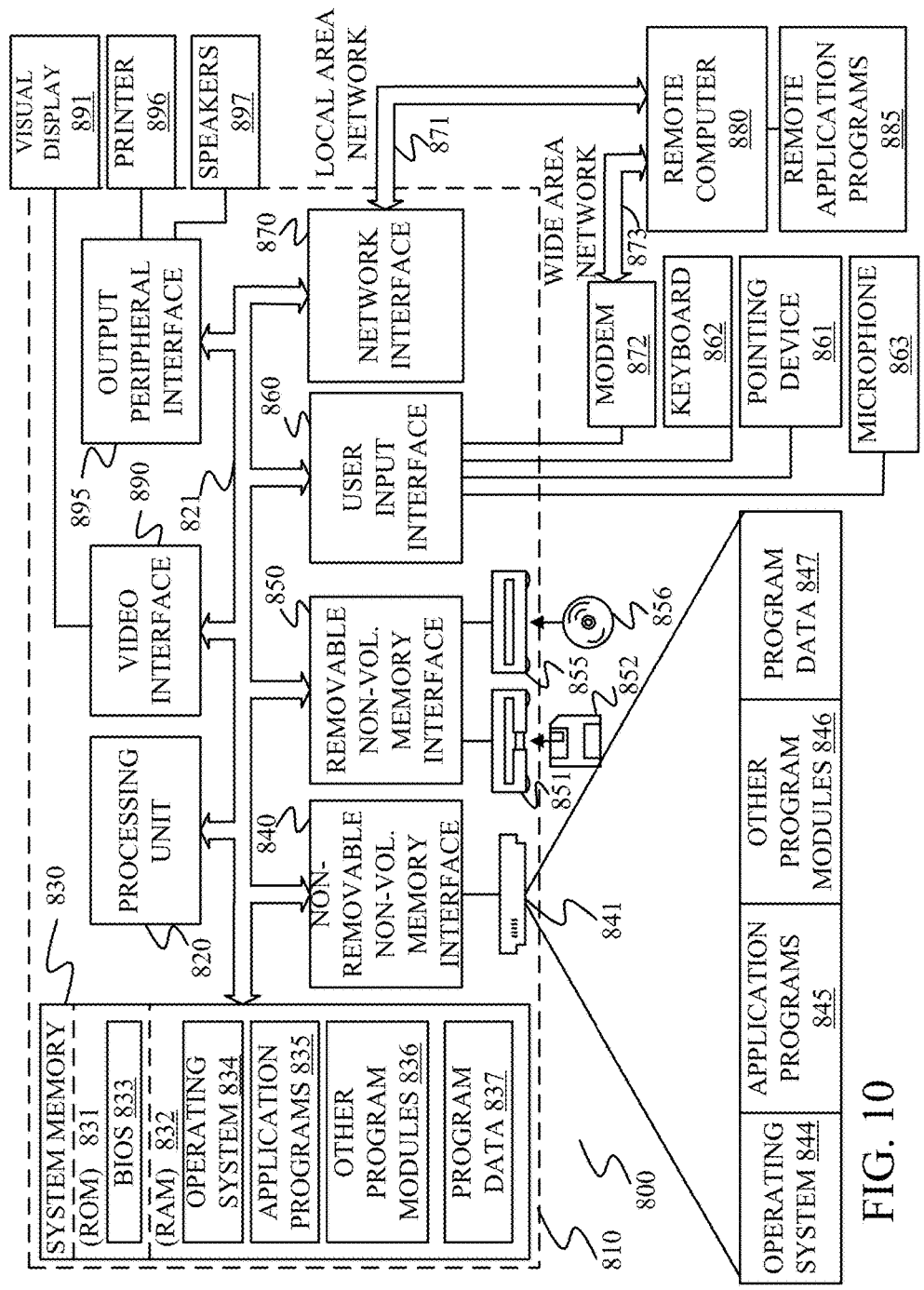
FIG. 10 is a general block diagram of a computing device that can run components of a data access system or client device that interacts with the data access system, or both.

FIG. 10 is one embodiment of a computing environment in which architecture 100, or parts of it, (for example) can be deployed. With reference to FIG. 10, an exemplary system for implementing some embodiments includes a general-purpose computing device in the form of a computer 810. Components of computer 810 may include, but are not limited to, a processing unit 820, system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system that provides access to electronic content includes a processor, a data store, and a user interface component. The data store is coupled to the processor and configured to store the electronic content. The user interface component is coupled to the processor and configured to generate a user interface allowing an internal user to generate a sharing request to share electronic content with an external user. The processor is configured to determine whether the internal user is a member of a group that is allowed to externally share content and to inhibit external sharing of the electronic content if the internal user is not a member of the group that is allowed to externally share the electronic content.

Example 2 is the computing system of any or all previous examples wherein the processor is configured to allow the external sharing request if the internal user is a member of a group that is allowed to externally share the content.

Example 3 is the computing system of any or all previous examples wherein the electronic content includes a site stored in the data store.

Example 4 is the computing system of any or all previous examples wherein the electronic content includes a folder stored in the data store.

Example 5 is the computing system of any or all previous examples wherein the electronic content includes a file stored in the data store.

Example 6 is the computing system of any or all previous examples wherein the processor is further configured to generate a notification that the sharing request has been denied.

Example 7 is the computing system of any or all previous examples wherein the notification is provided to the internal user.

Example 8 is the computing system of any or all previous examples and further comprising an access control component that maintains a list of internal users and security group membership information for the internal users.

Example 9 is the computing system of any or all previous examples wherein the processor is configured to engage the access control component to determine if the internal user is a member of a security group that is allowed to share the electronic content externally.

Example 10 is the computing system of any or all previous examples wherein the access control component includes a listing of electronic content that may be shared externally for each security group.

Example 11 is the computing system of any or all previous examples wherein the processor is configured to engage the access control component to determine if the internal user is a member of a security group that is allowed to share the electronic content externally.

Example 12 is a computing system that provides access to electronic content includes a processor, a data store, a user interface component, and an access control component. The data store is coupled to the processor and is configured to store the electronic content. The user interface component is coupled to the processor and configured to generate a user interface allowing a responsible party to specify a group of internal users who are allowed to share at least some content externally. The access control component is configured to receive an external sharing request from an internal user and determine if the internal user is a member of the group of internal users and to selectively allow the sharing request if the user is a member of the group of internal users.

Example 13 is the computing system of any or all previous examples wherein the access control component is further configured to determine if the external sharing request is also for content that the group of internal users is allowed to externally share.

Example 14 is the computing system of any or all previous examples wherein the processor is configured to generate a notification that the external sharing request is denied.

Example 15 is the computing system of any or all previous examples wherein the processor is configured to generate a sharing link to share the content externally.

Example 16 is the computing system of any or all previous examples wherein the external sharing request is received through an application programming interface (API).

Example 17 is a computer-implemented method of sharing electronic content using a data storage system. The method includes receiving a request from an internal user to share electronic content stored in the data storage system externally. The method determines if the internal user is a member of a defined group of internal users for whom external sharing is allowed. If the internal user is a member of the defined group of internal users for whom external sharing is allowed, sharing the electronic content externally.

Example 18 is the computer-implemented method of any or all previous examples wherein the request is received through an application programming interface of the data storage system.

Example 19 is the computer-implemented method of any or all previous examples wherein the application programming interface is configured to receive a request from a plurality of different user device modalities.

Example 20 is the computer-implemented method of any or all previous examples and further comprising generating a notification indicating that the internal user is not a member of the defined group if the internal user is not a member of the defined group for whom external sharing is allowed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system configured to provide access to electronic content, the system comprising:
   a processor;
   memory storing instructions executable by the processor, wherein the instructions, when executed, configure the computing system to:
   store the electronic content in a data store associated with the computing system, wherein a plurality of internal users are associated with the computing system;
   provide an access control component that stores security group information that:
   defines a set of users as members of a security group, the set of users comprises some, but not all, of the plurality of internal users, and
   defines a security permission for the members of the security group relative to external content sharing;
   receive a sharing request to share the electronic content with an external user, the sharing request being associated with a particular one of the internal users; and
   based on the security group information,
   allow external sharing of the electronic content with the external user if the particular internal user is a member of the security group that is allowed to externally share the electronic content; and
   inhibit external sharing of the electronic content with the external user if the internal user is not a member of the security group that is allowed to externally share the electronic content.

2. The computing system of claim 1, wherein the electronic content includes a site stored in the data store.

3. The computing system of claim 1, wherein the electronic content includes a folder stored in the data store.

4. The computing system of claim 1, wherein the electronic content includes a file stored in the data store.

5. The computing system of claim 1, and wherein the instructions configure the computing system to generate a notification that the sharing request has been denied.

6. The computing system of claim 5, wherein the notification is provided to the particular internal user.

7. The computing system of claim 1, wherein the plurality of internal users are associated with an organization and the external user is external to the organization.

8. The computing system of claim 7, wherein the instructions configure the computing system to engage the access control component to determine if the particular internal user is a member of a security group that is allowed to share the electronic content externally.

9. The computing system of claim 7, wherein the access control component includes a listing of electronic content that is externally sharable for each security group.

10. The computing system of claim 9, wherein the instructions configure the computing system to engage the access control component to determine if the particular internal user is a member of a security group that is allowed to share the electronic content externally.

11. A computing system comprising:
    a processor;
    memory storing instructions executable by the processor, wherein the instructions, when executed, configure the computing system to provide:
    a storage component configured to:
    store the electronic content in a data store associated with the computing system; and
    store internal user information that identifies a plurality of internal users associated with the computing system; and
    an access control component configured to:
    access security group information that:
    defines a set of users as members of a security group, the set of users comprises some, but not all, of the plurality of internal users, and
    defines a security permission for the members of the security group relative to external content sharing;
    receive, from a particular one of the internal users, an external sharing request that requests external sharing of the electronic content with an external user, that is a user other than the plurality of internal users; and based on the security group information, allow external sharing of the electronic content with the external user if the particular internal user is a member of the security group that is allowed to externally share content; and inhibit external sharing of the electronic content with the external user if the internal user is not a member of the security group that is allowed to externally share the electronic content.

12. The computing system of claim 11, wherein the access control component is further configured to determine if the external sharing request is also for content that the group of internal users is allowed to externally share.

13. The computing system of claim 12, wherein the access control component is configured to generate a notification that the external sharing request is denied.

14. The computing system of claim 12, wherein the access control component is configured to generate a sharing link to share the content externally.

15. The computing system of claim 11, wherein the external sharing request is received through an application programming interface (API).

16. A computer-implemented method comprising:

receiving a request from a particular internal user, of a plurality of internal users associated with a data storage system, to share electronic content stored in the data storage system with an external user that is external to the plurality of internal users associated with the data storage system;

accessing security group information that:

defines a set of users as members of a security group, the set of users comprises some, but not all, of the plurality of internal users, and defines a security permission for the members of the security group relative to external content sharing;

based on the security group information, determining if the particular internal user is a member of a security group for whom external sharing is allowed; and if the particular internal user is a member of a security group of internal users for whom external sharing is allowed, allowing external sharing the electronic content to the external user.

17. The computer-implemented method of claim 16, wherein the request is received through an application programming interface of the data storage system.

18. The computer-implemented method of claim 17, wherein the application programming interface is configured to receive a request from a plurality of different user device modalities.

19. The computer-implemented method of claim 16, and further comprising generating a notification indicating that the particular internal user is not a member of the defined group if the particular internal user is not a member of the defined group for whom external sharing is allowed.

* * * * *